TWO-WAY DATA COMPARE-SORT APPARATUS

Filed Feb. 1, 1961 2 Sheets-Sheet 1

INVENTOR.
PHILIP N. ARMSTRONG.

BY Robert H. Himes

ATTORNEY.

TWO-WAY DATA COMPARE-SORT APPARATUS

Filed Feb. 1, 1961 2 Sheets-Sheet 2

INVENTOR.
PHILIP N. ARMSTRONG,
BY Robert H. Himes
ATTORNEY.

3,143,645
Patented Aug. 4, 1964

3,143,645

TWO-WAY DATA COMPARE-SORT APPARATUS

Philip N. Armstrong, Santa Ana, Calif., assignor to Hughes Aircraft Company, Culver City, Calif., a corporation of Delaware Filed Feb. 1, 1961, Ser. No. 86,368
7 Claims. (Cl. 235—177)

This invention relates to a system for simultaneously comparing and sorting data serially by character and, more particularly, to a data handling apparatus for directing character data that is stored in two record blocks to appropriate sets of high and low lines as determined by the relative magnitudes of the character data.

The two-way data compare-sort apparatus of the present invention is a basic element out of which sorting apparatus may be composed that is adapted to sort character data simultaneously available on three or more sets of lines. For example, sorting apparatus composed of elements adapted to compare and sort data serially by bit and to simultaneously arrange six character data in a predetermined ordered sequence as defined by the relative magnitudes of the character data is disclosed in copending application for patent entitled: Minimal Storage Sorter, Philip N. Armstrong, inventor, Serial No. 771,482, filed November 3, 1958, now Patent No. 3,015,089, which application is assigned to the same assignee as is the present case. In particular, the apparatus disclosed in the Armstrong application for simultaneously arranging six character data is composed of twelve serial by bit two-way data compare-sort units. As is evidenced in this apparatus, it is essential that several of the two-way data compare-sort units of the present invention be used in cascade. That is, it is often necessary to use two or more of the two-way data compare-sort units in cascade to simultaneously arrange a plurality of character data. In order to effect a single compare-sort operation, present day two-way data compare-sort apparatuses generally require a plurality of clock signals within each bit interval thereby deteriorating the output signals to the extent that retiming of each signal between each successive pair of units in cascade becomes necessary. In a complex sorting apparatus this requires the introduction of substantial amounts of additional circuitry. In addition, it is advantageous to effect the compare and sort operation serial by character rather than serial by bit to economize on the time required to complete the sort operation.

It is therefore an object of the present invention to provide an improved two-way serial-by-character compare-sort apparatus.

Another object of the present invention is to provide a two-way serial-by-character compare-sort apparatus which operates with only the delay that is inherent in the components constituting the apparatus.

Still another object of the present invention is to provide a two-way serial-by-character compare-sort apparatus which requires only a single clock pulse within each bit interval.

In accordance with the present invention, first and second character data signals are each applied serially by character, with the most significant characters appearing first, to first and second gating networks. Concurrently with the above, first and second compare networks sample and sense when one signal is greater than the other and generate control signals which change levels commensing with the next succeeding bit interval following a difference in the first and second applied signals. The control signals thus generated are applied to the first and second gating networks. The operation of the apparatus is divided into Phases I, II and III. Phase I is defined as the portion of each record block during which the first and second character data signals are identical. During Phase I both of the first and second character data signals flow through both the first and second gating networks to high and low sets of output lines. Secondly, Phase II is defined as the first bit interval during which one of the character data signals differs from the other. During Phase II the gating networks generate appropriate high signals on the set of high lines and low signals on the set of low lines without distinguishing which of the signals is the greater. Also, during this interval the compare networks distinguish which of the character data signals is the greater and change the control signals accordingly. Lastly, Phase III is defined as the portion of the record block remaining after the first difference between the character data signals. During Phase III, the control signals applied to the gating networks change in a manner to direct the flow of the greater signal through to the set of high-lines and the lesser signal through to the low-lines.

The above-mentioned and other features and objects of this invention and the manner of obtaining them will become more apparent by reference to the following description taken in conjunction with the accompanying drawings, wherein.

Figure 1:
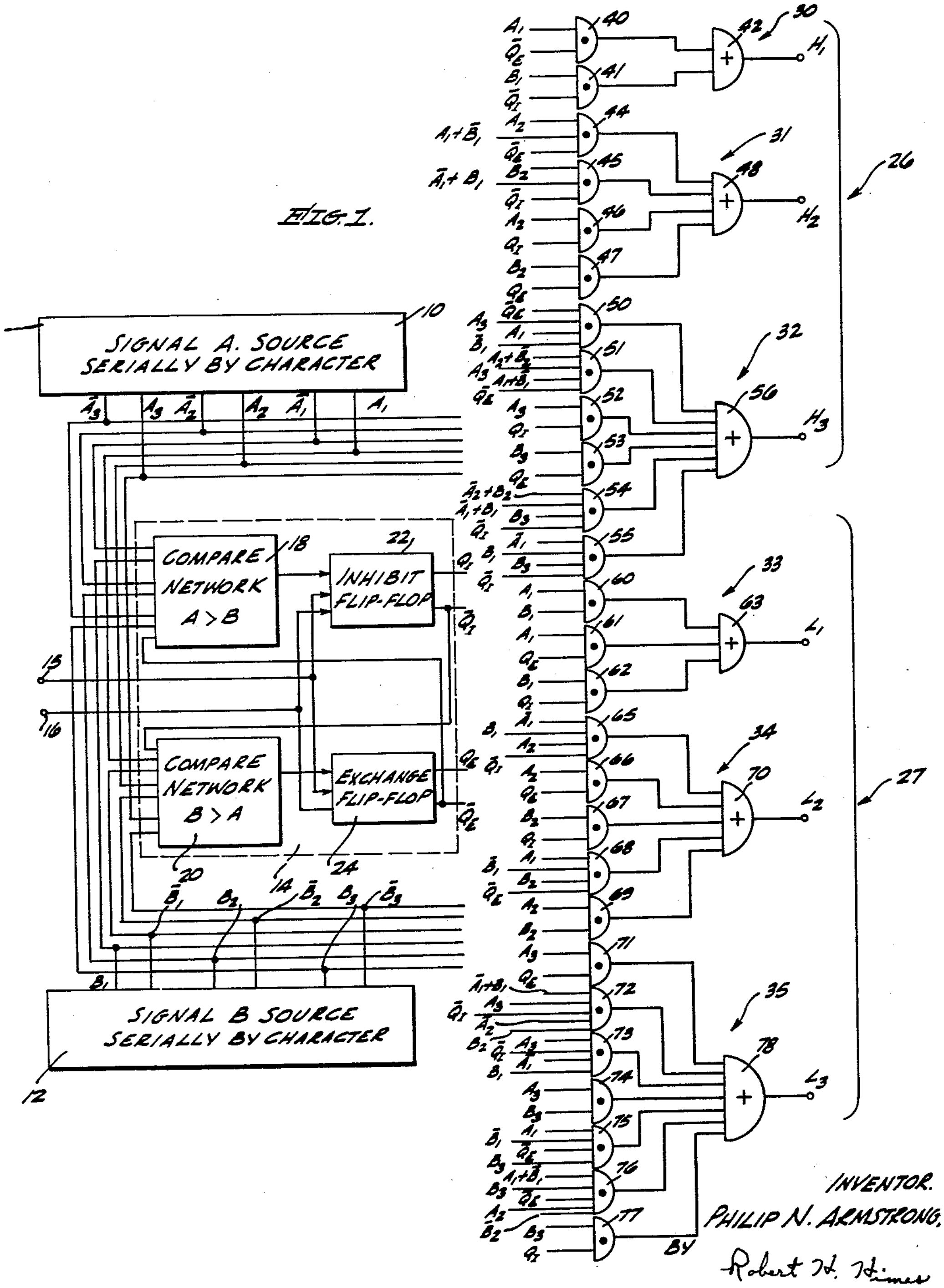
FIG. 1 shows a schematic block diagram of the apparatus of the present invention for three-digit characters.

In describing the apparatus of the present invention, a convention is employed wherein individual "and" and "or" gataes are shown as semicircular blocks with the inputs applied to the straight side and the output appearing on the semicircular side. An "and" gate is indicated by a dot (·) and an "or" gate by a plus (+) in the semicircular block. As is generally known, an "and" gate produces a "one" or information level output signal only when every input is at the information level, i.e., the output signal is the "conjunction" of the input signals. An "or" gate, on the other hand, produces an information level output signal when any one of the input signals applied thereto is at the information level, i.e., the output signal is the "alternation" of the input signals.

A further convention is employed in describing the particular embodiments of the present invention wherein leads to the upper and lower portion of the left side of the respective rectangles representing flip-flops, as they appear in the drawings, are designated as the set and reset inputs, respectively. Further, the principal and complementary output terminals from the flip-flop emanate from the upper and lower portion of the right side of the rectangle, respectively. An information level signal applied to either the set or reset input of a flip-flop will result in a change of state thereof at the next clock time provided that a zero level signal is applied to the remaining input, whereby an information level signal appears at the corresponding principal or complementary output terminal. Lastly, it is considered within the present state of the computer art that flip-flops may be employed which possess an "and" gate at its set and reset inputs, which "and" gate is an integral part of its circuit.

Lastly, conventions are employed wherein the complement of a signal is designated with a straight line drawn thereover and the most significant digits of a character have subscripts which commence with the numeral 1.

Referring now to FIG. 1 of the drawings, an embodiment of the present invention comprises a signal A source 10 which provides signals $A_1$, $\overline{A}_1$; $A_2$, $\overline{A}_2$; $A_3$, $\overline{A}_3$ serially by character and a signal B source 12 which provides signals $B_1$, $\overline{B}_1$; $B_2$, $\overline{B}_2$; $B_3$, $\overline{B}_3$. The signals $A_1$, $\overline{A}_1$; $A_2$, $\overline{A}_2$; $A_3$, $\overline{A}_3$ and $B_1$, $\overline{B}_1$; $B_2$, $\overline{B}_2$; $B_3$, $\overline{B}_3$ provided by sources 10 and 12, respectively, are applied to a compare apparatus 14 together with a clock pulse available at an input terminal 15 and a reset pulse available at a reset input terminal 16. The compare apparatus 14 includes a compare network 18 for sensing when signal A is representative of a greater numerical number than signal B and a similar compare network 20 for sensing when signal B is representative of a greater numerical number than signal A. The output of compare network 18 is applied to the set input of an inhibit flip-flop 22 and the output of compare network 20 is applied to the set input of an exchange flip-flop 24. The reset pulses available at reset input terminal 16 are applied to both the reset input terminals of inhibit and exchange flip-flops 22, 24, and the clock pulses available at input terminal 15 are applied to the clock pulse input terminals thereof. The complementary outputs of inhibit and exchange flip-flops 22, 24 are designated $\overline{Q}_I$, $\overline{Q}_E$, respectively, and the principal outputs are designated as $Q_I$, $Q_E$, respectively. The complementary outputs $\overline{Q}_I$, $\overline{Q}_E$ are applied to the compare networks 20, 18, respectively, in a manner such that only one change of state of the inhibit or exchange flip-flops 22, 24 can be made during each record block interval. In general, the voltage levels $Q_I$, $\overline{Q}_I$ and $Q_E$, $\overline{Q}_E$, available at the principal and complementary outputs of the inhibit and exchange flip-flops 22, 24, constitute control signals which are applied to a high-line gating network 26 and a low-line gating network 28 in a manner hereinafter described.

High-line gating network 26 includes a gating network 30 for high-line $H_1$ on which the most significant digits appear, a gating network 31 for high-line $H_2$ on which the next most significant digits appear, and a gating network 32 for high-line $H_3$ on which the least significant of three digits appear. Similarly, low-line gating network 28 includes a gating network 33 for low-line $L_1$ on which the most significant digits appear, a gating network 34 for low-line $L_2$ on which the next most signification digits appear, and a gating network 35 for low-line $L_3$ on which the least significant of three digits appear. In the aforementioned designations, the lower subscripts refer to the more significant digits of each character. Thus, in the present example, $H_1$ and $L_1$ refer to the most significant digit of the greater and lesser number, respectively, and $H_3$ and $L_3$ refer to the least significant digit.

In particular, gating network 30 includes, for example, a two-input "and" gate 40 responsive to signals $A_1$ and $\overline{Q}_E$ and a two-input "and" gate 41 responsive to signals $B_1$ and $\overline{Q}_I$. The outputs of the "and" gates 40, 41 are, in turn, applied to the inputs of an "or" gate 42, the output of which constitutes high-line $H_1$.

Secondly, gating network 31 includes, for example, a three-input "and" gate 44 responsive to signals $A_2$, $\overline{Q}_E$ and $(A_1+\overline{B}_1)$; a three-input "and" gate 45 responsive to signals $B_2$, $\overline{Q}_I$ and $(\overline{A}_1+B_1)$; a two-input "and" gate 46 responsive to signals $A_2$ and $Q_I$; and a two-input "and" gate 47 responsive to signals $B_2$ and $Q_E$. The outputs of the "and" gates 47–47 are, in turn, applied to the inputs of a four-input "or" gate 48, the output of which constitutes high-line $H_2$ Lastly, the gating network 32 includes, for example, a four-input "and" gate 50 responsive to signals $A_3$, $\overline{Q}_E$, $A_1$, and $\overline{B}_1$; a four-input "and" gate 51 responsive to signals $A_3$, $\overline{Q}_E$, $(A_1+\overline{B}_1)$ and $(A_2+\overline{B}_2)$; a two-input "and" gate 52 responsive to signals $A_3$ and $Q_I$; a two-input "and" gate 53 responsive to input signals $B_3$ and $Q_E$; a four-input "and" gate 54 responsive to signals $(\overline{A}_2+B_2)$, $(\overline{A}_1+B_1)$, $B_3$ and $\overline{Q}_I$; and a four-input "and" gate 55 responsive to signals $\overline{A}_1$, $B_1$, $B_3$ and $\overline{Q}_I$. The outputs of the "and" gates 50, 51, 52, 53, 54 and 55 are, in turn, applied to the inputs of an "or" gate 56, the output of which constitutes high-line $H_3$.

The gating network 28, on the other hand, includes gating network 33 which includes, for example, a two-input "and" gate 60 responsive to signals $A_1$ and $B_1$; a two-input "and" gate 61 responsive to signals $A_1$ and $Q_E$; and a two-input "and" gate 62 responsive to signals $B_1$ and $Q_I$. The outputs of the "and" gates 60, 61 and 62 are, in turn, applied to the inputs of an "or" gate 63, the output of which constitutes the low line $L_1$. Secondly, the low-line gating network 34 is provided by a four-input "and" gate 65 responsive to signals $\overline{A}_1$, $B_1$, $A_2$ and $\overline{Q}_I$; a two-input "and" gate 66 responsive to signals $A_2$ and $Q_E$; a two-input "and" gate 67 responsive to signals $B_2$ and $Q_I$; a four-input "and" gate 68 responsive to signals $A_1$, $\overline{B}_1$, $B_2$ and $\overline{Q}_E$; and a two-input "and" gate 69 responsive to signals $A_2$ and $B_2$. The output of "and" gates 65–69 are, in turn, applied to the inputs of a five-input "or" gate 70, the output of which constitutes low-line $L_2$.

Lastly, gating network 35 is provided by a two-input "and" gate 71 responsive to signals $A_3$ and $Q_E$; a five-input "and" gate 72 responsive to signals $(\overline{A}_1+B_1)$, $A_3$, $Q_I$, $\overline{A}_2$ and $B_2$; a four-input "and" gate 73 responsive to signals $A_3$, $Q_I$, $\overline{A}_1$ and $B_1$; a two-input "and" gate 74 responsive to signals $A_3$ and $B_3$; a four-input "and" gate 75 responsive to signals $A_1$, $\overline{B}_1$, $\overline{Q}_E$ and $B_3$; a five-input "and" gate 76 responsive to signals $(A_1+\overline{B}_1)$, $B_3$, $\overline{Q}_E$, $A_2$ and $\overline{B}_2$; and a two-input "and" gate 77 responsive to signals $B_3$ and $Q_I$. The outputs of "and" gates 71–77 are, in turn, applied to the inputs of a seven input "or" gate 78, the output of which constitutes the low-line $L_3$. In the foregoing description, it is assumed that additional gates may be interposed between the signals A and B sources 10, 12 and the gating networks 26, 28 to provide the alternative of two or more signals where designated.

Figure 2:
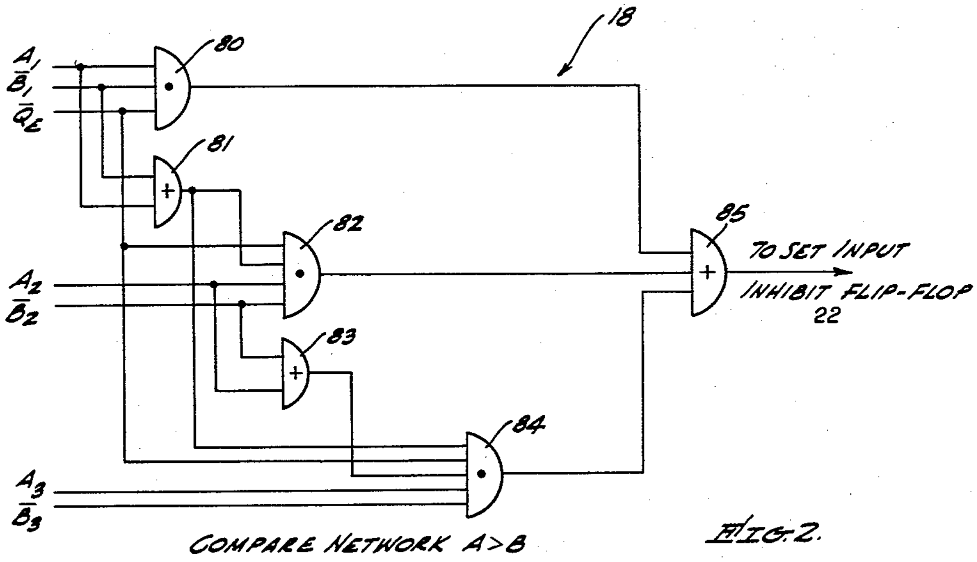
FIG. 2 shows an embodiment of the compare network of FIG. 1 capable of detecting when signal A is greater than signal B.

Referring to FIG. 2, there is shown an embodiment of the compare network 18 which generates an information level signal when the three-digit character signal A is greater numerically than the signal B. The network 18 includes, for example, a three-input "and" gate 80 responsive to signals $A_1$, $\overline{B}_1$ and $\overline{Q}_E$; a two-input "or" gate 81 responsive to signals $A_1$ and $\overline{B}_1$; a four-input "and" gate 82 responsive to signals $A_2$, $\overline{B}_2$, $\overline{Q}_E$ and the signal available at the output of "or" gate 81, i.e., $(A_1+\overline{B}_1)$; a two-input "or" gate 83 responsive to signals $A_2$ and $\overline{B}_2$; and a five-input "and" gate 84 responsive to signals $A_3$, $\overline{B}_3$, $\overline{Q}_E$ and the signals available at the outputs of "or" gates 81, 83, i.e., $(A_1+\overline{B}_1)$ and $(A_2+\overline{B}_2)$. The outputs of "and" gates 80, 82, 84 are, in turn, connected to a three-input "or" gate 85, and the output thereof applied to the set input of inhibit flip-flop 22. In operation, the "and" gates 80, 82, 84 can only produce an information level signal when the complementary signal $\overline{Q}_E$ from the exchange flip-flop 24 is at the information level. Thus, once the exchange flip-flop 24 is set, making $\overline{Q}_E$ return to the zero level, the compare network 18 cannot generate an information level signal until such time as the exchange flip-flop 24 is reset. Assuming signal $\overline{Q}_E$ to be at the information level, the compare network 18 will produce an information level signal when either of the "and" gates 80, 82 or 84 generate an information level signal. In particular, "and" gate 80 generates an information level signal when signal $A_1$ is at the information level and signal $B_1$ is at the zero level whereby its complement, signal $\overline{B}_1$, is at the information level. When this is the case, the information level signal will flow through "or" gates 85 to the set input of inhibit flip-flop 22. Since signals $A_1$ and $B_1$ are the most significant digits of the character data being compared, these digits will be given weight so as to override any difference of the lesser significant digits. Secondly, "and" gate 82 will generate an information level signal when signal $A_2$ is at the information level and $B_2$ is at zero level, i.e., $\overline{B}_2$ is at information level, and either $A_1$ or $\overline{B}_1$ is at information level. When this latter condition is true, either the most significant digit of signal A is at information level or the most significant digit of signal B is at zero level. When this is the case, signal $B_1$ cannot be larger than signal $A_1$ although there is a possibility that the signals $A_1$ and $B_1$ can both be either at information level or at zero level. For example, if signals $A_1$ and $B_1$ are both at zero level, $\overline{B}_1$ would be at information level. On the other hand, if $A_1$ and $B_1$ are both at information level, $A_1$ would be at information level so that a comparison can be made of digits $A_2$ and $B_2$. "And" gate 80 would not produce an information level signal under the foregoing circumstances. Alternatively, if signals $A_1$ and $\overline{B}_1$ were at information level, whereby "and" gate 80 would generate an information level signal, any generation of an information level signal by "and" gates 82 and 84 would be redundant.

Lastly, "and" gate 84 generates an information level signal when $A_3$ is at information level, $B_3$ is at zero level, either $A_2$ is at information level or $B_2$ is at zero level, and either $A_1$ is at information level or $B_1$ is at zero level. In effect, digits $A_3$ and $B_3$ are compared by compare network 18 only when $A_1 \geqq B_1$ and $A_2 \geqq B_2$. When these conditions exist, "and" gate 84 generates an information level signal which flows through "or" gate 85 to the set input of inhibit flip-flop 22.

Figure 3:
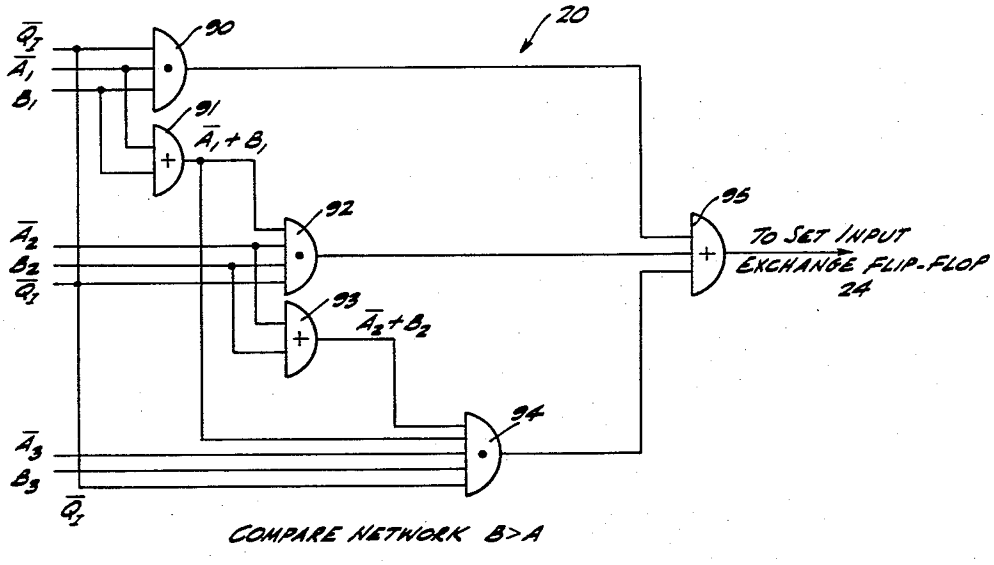
FIG. 3 shows an embodiment of the compare network of FIG. 1 capable of detecting when signal B is greater than signal A.

Referring to FIG. 3, there is shown an embodiment of compare network 20 which generates an information level signal when signal B is greater than signal A. Compare network 20 includes a three-input "and" gate 90 responsive to signals $\overline{A}_1$, $B_1$ and $\overline{Q}_I$; a two-input "or" gate 91 responsive to signals $\overline{A}_1$ and $B_1$; a four-input "and" gate 92 responsive to signals $\overline{A}_2$, $B_2$, $\overline{Q}_I$ and the signal available at the output of "or" gate 91, i.e., $(\overline{A}_1+B_1)$; a two-input "or" gate 93 responsive to signals $\overline{A}_2$ and $B_2$; and a five-input "and" gate 94 responsive to signals $\overline{A}_3$, $B_3$, $\overline{Q}_I$ and the signals available at the output of "or" gates 91, 93, i.e., $(\overline{A}_1+B_1)$ and $(\overline{A}_2+B_2)$. The outputs of "and" gates 90, 92 and 94 are applied to the inputs of an "or" gate 95, the output of which is connected to the set input of exchange flip-flop 24. In general, the operation of compare network 20 is the same as that of compare network 18 with the exception that complementary signals are applied whereby an information level signal is generated when signal B is numerically greater than signal A. Also, $\overline{Q}_I$ is used as the control signal whereby an information level signal can be generated only when $\overline{Q}_I$ is at information level which will be the case so long as signal A has not previously been greater than signal B. An information level signal is generated at the output of "and" gate 90 when signal $B_1$ is at information level and signal A is at zero level. Also, comparisons between the lesser significant digits are only permitted when the corresponding more significant digits are either equal or the B digit is greater than the corresponding A digit.

Referring now to FIG. 1, the operation of the gating networks 26, 28 will be explained in terms of the previously defined Phases I, II and III. Phase I will first be considered.

*Phase I.*—During this phase, $\overline{Q}_E$ and $\overline{Q}_I$ are at information level, $Q_I$ and $Q_E$ are at zero level and signals $A_1$ and $B_1$ are identical. Rerferring to gating network 30, signals $A_1$ and $B_1$ both pass through "and" gates 40, 41, respectively, and then through "or" gate 42 to high-line $H_1$. Also, concerning low-line $L_1$, signals $A_1$ and $B_1$ both flow through "and" gate 60 and "or" gate 63 to the $L_1$ terminal. No signals flow through "and" gates 61 and 62 during Phase I as $Q_E$ and $Q_I$ are at zero level.

Considering now the second most significant digits represented by signals $A_2$ and $B_2$ which are identical during Phase I, it is noted that the signals $(A_1+\overline{B}_1)$ and $(\overline{A}_1+B_1)$ are always at information level during Phase I in that the signals $A_1$ and $B_1$ are equal during this interval. Thus, so long as this is the case, signals $A_2$ and $B_2$ will flow through "and" gates 44, 45, respectively, and then through "or" gate 48 to the high-line terminal $H_2$. No signals flow through "and" gates 46 and 47 during Phase I as the control signals $Q_I$ and $Q_E$ remain at zero level during this phase. Referring to gating network 34 which generates the signal for low-line $L_2$, it is first noted that no signals flow through "and" gates 66 or 67 as $Q_E$ and $Q_I$ remain at zero level. Also, no signals flow through "and" gates 65 or 68 during Phase I as the input signals applied thereto require a difference between signals $A_1$ and $B_1$ as a requirement to an information level signal being generated at the output of these gates. Thus, during Phase I signals $A_2$ and $B_2$ can only flow through "and" gate 69 and "or" gate 70 to the low-line terminal $L_2$.

Consider now the least significant digits represented by signals $A_3$ and $B_3$ which also are identical during Phase I, and note that the signals $(A_1+\overline{B}_1)$, $(\overline{A}_1+B_1)$, $(A_2+\overline{B}_2)$ and $(\overline{A}_2+B_2)$ remain at information level during Phase I. Referring now to gating network 32, it is first noted that signals $A_3$ and $B_3$ flow through "and" gates 50, 54, respectively, and then through "or" gate 56 to high-line $H_3$. No signals flow through "and" gates 52, 53 during Phase I in that control signals $Q_I$ and $Q_E$ remain at zero level. Also, no signals flow through "and" gates 50 or 55 during Phase I as the input signals applied thereto require a difference between signals $A_1$ and $B_1$ as a requirement to an information level signal being generated at the output of these gates. Referring now to gating network 35, no signal will be developed at the output of "and" gates 72, 73, 75 or 76 during Phase I in that there is no difference between signals $A_1$ and $B_1$ or $A_2$ and $B_2$ during this period. Signals $A_3$ and $B_3$ flow through "and" gate 74, however, and then through "or" gate 78 to low-line $L_3$. Also, since signals $Q_E$ and $Q_I$ are at zero level, no signals flow through "and" gates 71 or 77.

*Phase II.*—During this phase as previously defined, one signal for the first time differs from the other and the control signals $Q_I$, $\overline{Q}_I$ and $Q_E$ and $\overline{Q}_E$ remain unchanged prior to and during the existence of the clock pulse. Thus, irrespective of which signal is larger, if either $A_1$ or $B_1$ is at information level, an information level signal must be generated at the high-line terminal $H_1$. Referring to gating network 30, it is evident that only if both signals $A_1$ and $B_1$ are at zero level is a zero level signal generated at high-line $H_1$. On the other hand, referring to gating network 33, if the difference in the two signals occurs in the most significant digit, a zero level signal will be generated at the output of "and" gate 60, which signal is transposed to low-line $L_1$ by "or" gate 63. No information level signals can be generated at the output of "and" gates 61, 62 during Phase II in that signals $Q_E$ and $Q_I$ remain at zero level.

Considering now the second most significant digits, the signal $(A_1+\overline{B}_1)$ will be at information level only if $A_1$ is greater than or equal to $B_1$. Under these circumstances, gating network 31 allows signal $A_2$ to pass through "and" gate 44 and "or" gate 48 to high-line $H_2$. On the other hand, if signal $B_1$ is greater than or equal to signal $A_1$, signal $(\overline{A}_1+B_1)$ is at information level whereby signal $B_2$ is allowed to pass through "and" gate 45 and "or" gate 48 to the high-line terminal $H_2$. No output signal is generated at the outputs of "and" gates 46, 47 during Phase II. Referring now to gating network 34, which generates the signal which appears on low-line $L_2$, it is noted that no signal is generated during Phase II at the outputs of "and" gates 66 and 67 in that $Q_E$ and $Q_I$ are at zero level. Next, if the difference during Phase II does not occur in the second most significant digit, a signal is generated at the output of "and" gate 69 provided that signals $A_2$ and $B_2$ are both at information level. In this latter case, the difference between the signals A and B would then necessarily have to reside in the first or third most significant digit. If the difference is in the second most significant digit, however, the output of "and" gate 69 must necessarily generate a zero level signal which is the desired output under these circumstances. Further, if signal $B_1$ is greater than $A_1$, signal $A_2$ will be allowed to pass through "and" gate 65 and "or" gate 70 to low-line terminal $L_2$. Alternatively, if signal $A_1$ is greater than $B_1$, signal $B_2$ will be allowed to pass through "and" gate 68 and "or" gate 70 to low-line terminal $L_2$. Thus, if the difference resides in the most significant digit, the signal $A_2$ or $B_2$ corresponding to the lesser of signals $A_1$ and $B_1$ is generated at an output of "and" gates 65 or 68 which, in turn, flows through "or" gate 70 to low-line terminal $L_2$.

Consider now the third most significant digit. Referring to gating network 32, if signal $A_1$ is greater than $B_1$, signal $A_3$ is allowed to pass through "and" gate 50 and "or" gate 56 to high-line $H_3$. Alternatively, if signal $B_1$ is greater than signal $A_1$, signal $B_3$ is allowed to pass through "and" gate 55 and "or" gate 56 to high-line $H_3$. It is evident that when there is a difference in the most significant digit, this difference controls and hence determines whether the remaining digits should be directed towards the high- or low-lines H or L irrespective of the comparative magnitudes thereof. Secondly, if $A_1$ is greater or equal to $B_1$, and $A_2$ is greater than or equal to $B_2$, i.e., signals $(A_1+\overline{B}_1)$ and $(A_2+\overline{B}_2)$ are at information level, signal $A_3$ passes through "and" gate 51 and appears on high-line $H_3$. Alternatively, if $B_1$ is greater than or equal to $A_1$ and $B_2$ is greater than or equal to $A_2$, i.e., signals $(\overline{A}_1+B_1)$ and $(\overline{A}_2+B_2)$ are at information level, signal $B_3$ passes through "and" gate 54 and appears on high-line $H_3$. Thus, if the difference occurs in the third most significant digit, i.e., an information level signal is always generated on high-line $H_3$. No signals pass through "and" gates 52, 53 during Phase II in that $Q_I$ and $Q_E$ remain at zero level.

Referring to gating network 35, if signal $A_1$ is greater than $B_1$, signal $B_3$ passes through "and" gate 75 and appears on low-line $L_3$. Alternatively, if signal $B_1$ is greater than signal $A_1$, signal $A_3$ passes through "and" gate 73 and appears on low-line $L_3$. Secondly, if signal $B_1$ is equal to or greater than signal $A_1$ and signal $B_2$ is greater than signal $A_2$, i.e., signals $(\overline{A}_1+B_1)$, $\overline{A}_2$ and $B_2$ are at information level, signal $A_3$ passes through "and" gate 72 and appears on low-line $L_3$. Alternatively, if signal $A_1$ is equal to or greater than signal $B_1$ and $A_2$ is greater than $B_2$, i.e., signals $(A_1+\overline{B}_1)$, and $A_2$ and $\overline{B}_2$ are at information level, signal $B_3$ passes through "and" gate 76 and appears on low-line $L_3$. Lastly, if $A_1=B_1$ and $A_2=B_2$, a zero level signal will be generated at the output of "and" gate 74 and low-line $L_3$ if $A_3$ does not equal $B_3$. If $A_3=B_3$ and are both at information level, an information level signal is developed by "and" gate 74, and on low-line $L_3$ as previously described. In view of the aforementioned definitions, however, this latter condition could not exist during Phase II. Also, no signals flow through "and" gates 71 or 77 in that control signals $Q_E$ and $Q_I$ are at zero level.

*Phase III.*—Commencing with Phase III either of the control signals $\overline{Q}_E$ or $\overline{Q}_I$ are at zero level and the corresponding principal output signal $Q_E$ or $Q_I$ assume information level as explained in connection with the description of compare network 14. Referring now to gating network 30, only the signal $A_1$ or $B_1$ corresponding to the larger of signal A or B is allowed to continue to flow through "and" gates 40 or 41, respectively, to the high output terminal $H_1$. On the other hand, the corresponding "and" gate 61 or 62 of gating network 33 is energized allowing the signal $A_1$ or $B_1$ corresponding to the lesser of signal A or B to pass through to low output terminal $L_1$. The signal appearing at the output of "and" gate 60 during Phase III is obviously redundant and does not conflict with the signal generated at the output of "and" gates 61 or 62.

Considering now the second most significant digit, the control signal $Q_I$ or $Q_E$ applied to "and" gates 46 or 47 of gating network 31 during Phase III will be at information level, allowing signal $A_2$ or $B_2$ to flow through to high output terminal $H_2$ during the remainder of the record block. Also, if $Q_I$ is at information level, $\overline{Q}_I$ will be at zero level, thus preventing an inconsistent signal from being generated at the output of "and" gate 45. The signal $\overline{Q}_E$, however, will remain at information level under these conditions, thus allowing signal $A_2$ to be generated at the output of "and" gate 44 under certain conditions of signals $A_1$ and $B_1$. This signal, however, never conflicts with the signal generated at the output of "and" gate 46. A similar condition exists when $Q_E$ is at information level and $\overline{Q}_I$ remains at information level. Thus, it is apparent that during Phase III only one signal, $A_2$ or $B_2$, can continue to flow through gating network 31 to high-line terminal $H_2$.

Considering now gating network 34, control signal $Q_E$ or $Q_I$ is now at information level, thus allowing one of the signals $A_2$ or $B_2$ to flow through "and" gates 66 or 67, respectively, to low-line terminal $L_2$. The signal $A_2 \cdot B_2$ generated at the output of "and" gate 69 during this phase is redundant, i.e., the signal $A_2 \cdot B_2$ does not conflict with either $A_2$ or $B_2$. Also, when control signal $Q_E$ is at information level thus passing signal $A_2$ through to low-line $L_2$, $\overline{Q}_E$ is at zero level which prevents a conflicting signal from being generated at the output of "and" gate 68. The signal $\overline{Q}_I$, however, will remain at information level, thus allowing signal $A_2$ to be generated under certain circumstances at the output of "and" gate 65. This signal, however, does not conflict with that generated at the output of "and" gate 66. A similar condition exists when signal $Q_I$ is at information level and $\overline{Q}_E$ remains at information level. Thus, only one of the signals $A_2$ or $B_2$ as determined by the control signals $Q_E$ and $Q_I$ can continue to flow through gating network 34 during Phase III.

Considering now the third most significant digit, the gating networks 32, 35 operate in substantially the same manner as gating networks 31, 34, respectively. That is, the control signals $Q_E$ and $Q_I$ determine which of the signals $A_3$ and $B_3$ is directed through "and" gates 52 or 53 to high-line $H_3$ and through "and" gates 71, 77 to low-line $L_3$. In each case, the complement $\overline{Q}_E$ or $\overline{Q}_I$ eliminates possible conflicting signals.

Although the above gating apparatus is described in connection with three-bit words, it is apparent that the disclosed teachings can be extended to *n*-bit words wherein *n* is a positive integer no less than one by application of the following logic:

$$H_1 = A_1 \cdot \overline{Q}_E + B_1 \cdot \overline{Q}_I \quad (1)$$

$$H_2 = A_2[(A_1+\overline{B}_1)Q_E + Q_I] + B_2[(\overline{A}_1+B_1)\overline{Q}_I + Q_E] \quad (2)$$

$$H_3 = A_3\{[A_1 \cdot \overline{B}_1 + (A_1+\overline{B}_1)(A_2+\overline{B}_2)]\overline{Q}_E + Q_I\} + B_3\{[B_1 \cdot \overline{A}_1 + (\overline{A}_1+B_1)(\overline{A}_2+B_2)]\overline{Q}_I + Q_E\} \quad (3)$$

$$H_n = A_n\left\{\left[A_1 \cdot \overline{B}_1 + \sum_{j=2}^{n-2} A_j \cdot \overline{B}_j \prod_{i=1}^{j-1} (A_i+\overline{B}_i) + \prod_{i=1}^{n-1} (A_i+\overline{B}_i)\right]\overline{Q}_E + Q_I\right\} + B_n\left\{\left[\overline{A}_i \cdot B_1 + \sum_{j=2}^{n-2} \overline{A}_j \cdot B_j \prod_{i=1}^{j-1} (\overline{A}_i+B_i) + \prod_{i=1}^{n-1} (\overline{A}_i+B_i)\right]\overline{Q}_I + Q_E\right\} \quad (4)$$

$$L_1 = A_1 \cdot Q_E + B_1 \cdot Q_I + A_1 \cdot B_1 \quad (5)$$

$$L_2 = A_2 \cdot Q_E + B_2 \cdot Q_I + A_2 \cdot B_2 + A_2(\overline{A}_1 \cdot B_1)\overline{Q}_I + B_2(A_1 \cdot \overline{B}_1)\overline{Q}_E \quad (6)$$

$$L_3=A_3\cdot Q_E+B_3\cdot Q_I+A_3\cdot B_3+(\overline{A}_1+B_1)(\overline{A}_2\cdot B_2)A_3\cdot Q_I \quad (7)$$

$$+\overline{A}_1\cdot B_1\cdot A_3\cdot\overline{Q}_I+A_1\cdot\overline{B}_1\cdot B_3\cdot\overline{Q}_E+(A_1+\overline{B}_1)(A_2\cdot\overline{B}_2)B_3\cdot\overline{Q}_E$$

$$L_n=A_n\cdot Q_E+B_n\cdot Q_I+A_n\cdot B_n \quad (8)$$

$$+A_n\cdot\overline{Q}_1\left[\overline{A}_1\cdot B_1+\sum_{j=2}^{n-1}\overline{A}_j\cdot B_j\prod_{i=1}^{j-1}(\overline{A}_i+B_i)\right]$$

$$+B_n\cdot\overline{Q}_E\left[A_1\cdot\overline{B}_1+\sum_{j=1}^{n-1}A_j\cdot\overline{B}_j\prod_{i=1}^{j-1}(A_i+\overline{B}_i)\right]$$

wherein $n$ is a positive integer no less than 3 and is equal to the number of bits in the words being compared and sorted. Also, in the above relations, $$\sum_{j=m}^{n}X_j$$

designates the logical sum:

$$\sum_{j=m}^{n}X_j=X_m+X_{m+1}+X_{m+2}\ldots+X_{n-2}+X_{n-1}+X_n$$

and $$\sum_{j=m}^{n}Y_i$$

designates the logical product:

$$\prod_{j=m}^{n}Y_m\cdot Y_{m+1}\cdot Y_{m+2}\ldots Y_{n-2}\cdot Y_{n-1}\cdot Y_n$$

In either case, when the upper limit is less than the lower limit, the respective terms do not appear. Further, when the upper limit is the same as the lower limit, only a single term appears.

Also, when $n$-bit characters are employed, the compare networks 18, 20 for setting the inhibit and exchange flip-flops 22, 24, respectively, must be modified so as to generate the following logic:

Logic generated by compare network 18 for setting inhibit flip-flop 22:

$$\overline{Q}_E\{A_1\cdot\overline{B}_1+(A_1+\overline{B}_1)A_2\cdot\overline{B}_2+\ldots+(A_1+\overline{B}_1)(A_2+\overline{B}_2)\ldots(A_{n-1}+\overline{B}_{n-1})A_n\cdot B_n\} \quad (9)$$

Logic generated by compare network 20 for setting exchange flip-flop 24:

$$\overline{Q}_I\{\overline{A}_1\cdot B_1+(\overline{A}_1+B_1)\overline{A}_2\cdot B_2+\ldots+(\overline{A}_1+B_1)(\overline{A}_2+B_2)\ldots(\overline{A}_{n-1}+B_{n-1})\overline{A}_n\cdot B_n\} \quad (10)$$

It is apparent to those skilled in the art that the above logic may be fabricated by the use or "nor" and/or "nand" gates equally as well as with "and" and "or" gates as illustrated in connection with the description of FIGS. 1, 2 and 3.

What is claimed is:

1. A digital computer apparatus comprising first and second input terminals responsive, respectively, to character data signals, A and B, each having corresponding bits; third and fourth input terminals responsive, respectively, to character data signals, $\overline{A}$ and $\overline{B}$, which are complementary, respectively, to said character data signals A and B; means for sampling at least two of said character data signals, A, B, $\overline{A}$ and $\overline{B}$ for generating an electrical indication at a first terminal when the portion of said character data signal A which has appeared is for the first time representative of a number that is greater than and different from the number represented by the corresponding portion of character data signal B and for generating an electrical indication at a second terminal when the portion of said character data signal B which has appeared is for the first time representative of a number that is greater than and different from the number represented by the corresponding portion of character data signal A; means connected to said first and second terminals for generating first and second bi-level control signals $Q_1$ and $Q_2$, said signal $Q_1$ changing from information to zero level in response to an electrical indication at said first terminal and said signal $Q_2$ changing from information to zero level in response to an electrical indication at said second terminal; and means coupled to said first, second, third and fourth input terminals and responsive to said control signals for producing at a first output terminal an electrical signal representative of the logical sum of $A\cdot Q_2$ and $B\cdot Q_1$ and for producing at a second output terminal an electrical signal representative of the logical sum of $A\cdot\overline{Q}_2$, $B\cdot\overline{Q}_1$ and $A\cdot B$ wherein a dot ($\cdot$) between two signals designates the logical product of the signals.

2. A digital computer apparatus comprising first, second, third and fourth sets of input terminals responsive, respectively, to signals A, $\overline{A}$, B and $\overline{B}$, which signals appear serially by character, the respective characters of the signals A, $\overline{A}$, B and $\overline{B}$ having bits $A_1$, $A_2$; $\overline{A}_1$, $\overline{A}_2$; $B_1$, $B_2$; and $\overline{B}_1$, $\overline{B}_2$, which bits appear simultaneously and where the subscript 1 designates the most significant digit and the subscript 2 designates the next most significant digit; means for sampling the respective bits of at least two of said signals A, $\overline{A}$ and B, $\overline{B}$ for generating an electrical indication at a first terminal when the portion of said signal A which has appeared is for the first time representative of a number that is greater than and different from the number represented by the corresponding portion of signal B, and for generating an electrical indication at a second terminal when the portion of said signal B which has appeared is for the first time representative of a number that is greater than and different from the number represented by the corresponding portion of signal A; means connected to said first and second terminals for generating first and second bi-level control signals $Q_1$ and $Q_2$, said signal $Q_1$ changing from information to zero level in response to an electrical indication at said first terminal and said signal $Q_2$ changing from information to zero level in response to an electrical indication at said second terminal; and means coupled to said first, second, third and fourth sets of input terminals and responsive to said control signals for producing at a first output terminal an electrical signal representative of the logical sum of $A_1\cdot Q_2$ and $B_1\cdot Q_1$, and for producing at a second output terminal an electrical signal representative of $A_2[(A_1-\overline{B}_1)Q_2+\overline{Q}_1]+B_2[(\overline{A}_1+B_1)Q_1+\overline{Q}_2]$, the signals appearing at said first and second output terminals representing the most and the next most significant digits of the greater of said signals A and B.

3. The digital computer apparatus as defined in claim 2 which additionally includes means coupled to said first, second, third and fourth sets of input terminals and responsive to said control signals for producing at a third output terminal an electrical signal representative of $A_1\cdot\overline{Q}_2+B_1\cdot\overline{Q}_1+A_1\cdot B_1$, and for producing at a fourth output terminal an electrical signal representative of $$A_2\cdot\overline{Q}_2+B_2\cdot\overline{Q}_1+A_2\cdot B_2+A_2\cdot\overline{A}_1\cdot B_1\cdot Q_1+B_2\cdot A_1\cdot\overline{B}_1\cdot Q_2$$

the signals appearing at said third and fourth output terminals representing the most and next most significant digits of the lesser of said signals A and B.

4. A digital computer apparatus comprising first, second, third and fourth sets of input terminals responsive, respectively, to signals A, $\overline{A}$, B, $\overline{B}$, which signals appear serially by character, the respective characters of the signals A, $\overline{A}$ and B, $\overline{B}$ having bits $A_1$, $A_2$ . . . $A_m$, $\overline{A}_1$, $\overline{A}_2$ . . . $\overline{A}_m$, $B_1$, $B_2$ . . . $B_m$ and $\overline{B}_1$, $\overline{B}_2$ . . . $\overline{B}_m$, which bits appear simultaneously and wherein the subscripts 1, 2, . . . $m$ designate the most to the least significant digits, respectively; means for sampling at least two of said signals A, $\overline{A}$ and B, $\overline{B}$ for generating an electrical indication at a first terminal when the portion of said signal A which has appeared is for the first time representative of a number that is greater than and different from the number represented by the corresponding portion of signal B, and for generating an electrical indication at a second terminal when the portion of said signal B which has appeared is for the first time representative of a number that is greater than and different from the number represented by the corresponding portion of signal A; means connected to said first and second terminals for generating first and second bi-level control signals $Q_1$ and $Q_2$, said signal $Q_1$ changing from information to zero level in response to an electrical indication at said first terminal and said signal $Q_2$ changing from information to zero level in response to an electrical indication at said second terminal; and means coupled to said first, second, third and fourth sets of input terminals and responsive to said control signals for producing signals $H_1, H_2 \ldots H_m$ representative of the digits of the greater of said signals A and B at a set of output terminals wherein said signal $H_1$ is representative of $A_1 \cdot Q_2 + B_1 \cdot Q_1$; said signal $H_2$ is representative of $$A_2[(A_1+\overline{B}_1)Q_2+\overline{Q}_1]+B_2[(\overline{A}_1+B_1)Q_1+\overline{Q}_2]$$

and signal $H_n$ is representative of $$A_n\left\{\left[A_1\cdot\overline{B}_1+\sum_{j=2}^{n-2}A_j\cdot\overline{B}_j\prod_{i=1}^{j-1}(A_i+\overline{B}_i)+\prod_{i=1}^{n-1}(A_i+\overline{B}_i)\right]Q_2+\overline{Q}_1\right\}$$
$$+B_n\left\{\left[\overline{A}_1\cdot B_1+\sum_{j=2}^{n-2}\overline{A}_j\cdot B_j\prod_{i=1}^{j-1}(\overline{A}_i+B_i)+\prod_{i=1}^{n-1}(\overline{A}_i+B_i)\right]Q_1+\overline{Q}_2\right\}$$

wherein $n$ successively assumes integral values from 3 to $m$.

5. The digital computer apparatus as defined in claim 4 wherein said means for sampling at least two of said character data signals A, B, $\overline{A}$ and $\overline{B}$ for generating an electrical indication at a first terminal when the portion of said character data signal A which has appeared is for the first time representative of a number that is greater than or different from the number represented by the corresponding portion of character data signal B includes apparatus for generating an information level signal representative of $$Q_2\{A_1\cdot\overline{B}_1+(A_1+\overline{B}_1)A_2\cdot B_2+\ldots+(A_1+\overline{B}_1)(A_2+\overline{B}_2)\ldots(A_{n-1}+\overline{B}_{n-1})A_n\cdot\overline{B}_n\}$$

and said means for generating an electrical indication at a second terminal when the portion of said character data signal B which has appeared is for the first time representative of a number that is greater than and different from the number represented by the corresponding portion of character data signal A includes means for generating an information level signal representative of $$Q_1\{\overline{A}_1\cdot B_1+(\overline{A}_1+B_1)\overline{A}_2\cdot B_2+\ldots+(\overline{A}_1+B_1)(\overline{A}_2+B_2)\ldots(\overline{A}_{n-1}+B_{n-1})\overline{A}_n\cdot B_n\}$$

6. A digital computer apparatus comprising first, second, third and fourth sets of input terminals responsive, respectively, to signals A, $\overline{A}$, B, $\overline{B}$, which signals appear serially by character, the respective characters of the signals A, $\overline{A}$ and B, $\overline{B}$ having bits $A_1, A_2 \ldots A_m$, $\overline{A}_1$, $\overline{A}_2 \ldots A_m$, $B_1, B_2 \ldots B_m$ and $\overline{B}_1, \overline{B}_2 \ldots \overline{B}_m$, which bits appear simultaneously and wherein the subscripts 1, 2 . . . $m$ designate the most to the least significant digits, respectively; means for sampling at least two of said signals A, $\overline{A}$ and B, $\overline{B}$ for generating an electrical indication at a first terminal when the portion of said signal A which has appeared is for the first time representative of a number that is greater than and different from the number represented by the corresponding portion of signal B, and for generating an electrical indication at a second terminal when the portion of said signal B which has appeared is for the first time representative of a number that is greater than and different from the number represented by the corresponding portion of signal A; means connected to said first and second terminals for generating first and second bi-level control signals $Q_1$ and $Q_2$, said signal $Q_1$ changing from information to zero level in response to an electrical indication at said first terminal and said signal $Q_2$ changing from information to zero level in response to an electrical indication at said second terminal; and means coupled to said first, second, third and fourth sets of input terminals and responsive to said control signals for producing signals $L_1, L_2 \ldots L_m$ representative of the digits of the lesser of said signals A and B at a set of output terminals wherein said signal $L_1$ is representative of $A_1\cdot\overline{Q}_2+B_1\cdot\overline{Q}_1+A_1\cdot B_1$; said signal $L_2$ is representative of $$A_2\cdot\overline{Q}_2+B_2\cdot\overline{Q}_1+A_2\cdot B_2+A_2(\overline{A}_1\cdot B_1)Q_1+B_2(A_1\cdot\overline{B}_1)Q_2$$

and signal $L_n$ is representative of $$A_n\cdot\overline{Q}_2+B_n\cdot\overline{Q}_1+A_n\cdot B_n$$
$$+A_n\cdot Q_1\left[\overline{A}_1\cdot B_1+\sum_{j=2}^{n-1}\overline{A}_j\cdot B_j\prod_{i=1}^{j-1}(\overline{A}_i+B_i)\right]$$
$$+B_n\cdot Q_2\left[A_1\cdot\overline{B}_1+\sum_{j=1}^{n-1}A_j\cdot\overline{B}_j\prod_{i=1}^{j-1}(A_i+\overline{B}_i)\right]$$

wherein $n$ assumes successive integral values from 3 to $m$.

7. The digital computer apparatus as defined in claim 6 wherein said means for sampling at least two of said character data signals A, B, $\overline{A}$, $\overline{B}$ for generating an electrical indication at a first terminal when the portion of said character data signal A which has appeared is for the first time representative of a number that is greater than or different from the number represented by the corresponding portion of character data signal B includes apparatus for generating an information level signal representative of $$Q_2\{A_1\cdot\overline{B}_1+(A_1+\overline{B}_1)A_2\cdot B_2+\ldots+(A_1+\overline{B}_1)(A_2+\overline{B}_2)\ldots(A_{n-1}+\overline{B}_{n-1})A_n\cdot\overline{B}_n\}$$

and said means for generating an electrical indication at a second terminal when the portion of said character data signal B which has appeared is for the first time representative of a number that is greater than and different from the number represented by the corresponding portion of character data signal A includes means for generating an information level signal representative of $$Q_1\{\overline{A}_1\cdot B_1+(\overline{A}_1+B_1)\overline{A}_2\cdot B_2+\ldots+(\overline{A}_1+B_1)(\overline{A}_2+B_2)\ldots(\overline{A}_{n-1}+B_{n-1})\overline{A}_n\cdot B_n\}$$

References Cited in the file of this patent

UNITED STATES PATENTS 2,984,822 Armstrong et al. -------- May 16, 1961

UNITED STATES PATENT OFFICE

CERTIFICATE OF CORRECTION

Patent No. 3,143,645 — August 4, 1964

Philip N. Armstrong

It is hereby certified that error appears in the above numbered patent requiring correction and that the said Letters Patent should read as corrected below.

Column 3, line 61, for "47-47" read -- 44-47 --; column 9, lines 25 to 29, the structure should appear as shown below instead of as in the patent:

$$\prod_{j=m}^{n} Y_i$$

same column, line 52, for "or", first occurrence, read -- of --; column 10, line 47, for "$(A_1-\bar{B}_1)$" read -- $(\bar{A}_1+\bar{B}_1)$ --.

Signed and sealed this 9th day of February 1965.

(SEAL)
Attest:

ERNEST W. SWIDER
Attesting Officer

EDWARD J. BRENNER
Commissioner of Patents